(12) United States Patent
Okugawa et al.

(10) Patent No.: US 7,350,350 B2
(45) Date of Patent: Apr. 1, 2008

(54) EXHAUST GAS PURIFYING APPARATUS

(75) Inventors: Shinichiro Okugawa, Toyota (JP);
Kazuo Kobayashi, Nagoya (JP)

(73) Assignee: Denso Corporation (JP)

( * ) Notice: Subject to any disclaimer, the term of this patent is extended or adjusted under 35 U.S.C. 154(b) by 114 days.

(21) Appl. No.: 11/169,017

(22) Filed: Jun. 29, 2005

(65) Prior Publication Data
US 2006/0016179 A1  Jan. 26, 2006

(30) Foreign Application Priority Data
Jul. 22, 2004  (JP) ............................. 2004-214641

(51) Int. Cl.
*F01N 3/00* (2006.01)
(52) U.S. Cl. ............................. 60/297; 60/295; 60/311
(58) Field of Classification Search .................. 60/297, 60/311
See application file for complete search history.

(56) References Cited

U.S. PATENT DOCUMENTS

| | | | |
|---|---|---|---|
| 3,979,185 A * | 9/1976 | Stevenson .................... 422/119 |
| 4,211,075 A * | 7/1980 | Ludecke et al. ............... 60/285 |
| 4,512,147 A * | 4/1985 | Wong ........................... 60/274 |
| 5,551,971 A * | 9/1996 | Chadderton et al. ........... 95/15 |
| 5,853,459 A * | 12/1998 | Kuwamoto et al. ............ 95/273 |
| 5,956,944 A | 9/1999 | Dementhon et al. |
| 6,176,896 B1 * | 1/2001 | Dementhon et al. ........... 95/14 |
| 6,544,310 B2 * | 4/2003 | Badeau et al. ............. 55/385.3 |
| 6,673,414 B2 * | 1/2004 | Ketcham et al. ............. 428/116 |
| 6,758,030 B2 * | 7/2004 | Dettmann ..................... 56/11.9 |
| 6,851,258 B2 * | 2/2005 | Kawashima et al. .......... 60/311 |
| 2004/0123586 A1 * | 7/2004 | Kuboshima et al. .......... 60/277 |

FOREIGN PATENT DOCUMENTS

JP  2003-254038  9/2003

OTHER PUBLICATIONS

French Search Report dated Sep. 19, 2007 issued in corresponding French Application No. 0507727000.

* cited by examiner

*Primary Examiner*—Thomas Denion
*Assistant Examiner*—Loren Edwards
(74) *Attorney, Agent, or Firm*—Nixon & Vanderhye PC

(57) ABSTRACT

In an exhaust gas purifying apparatus for a diesel engine having a diesel particulate filter (DPF) provided in an exhaust pipe, a temperature of the DPF is indirectly detected (presumed) to prevent an over-heat of the DPF during a re-generation operation thereof. For that purpose, the DPF is hypothetically divided into multiple cells, the temperature at the respective cells is presumed based on a heat budget of the cell, and the maximum temperature among those multiple presumed temperatures is controlled to be lower than a predetermined value.

12 Claims, 12 Drawing Sheets

[TEMPERATURE OF DPF AT TIME POINT A]

○ PRESUMED VALUES BEFORE CORRECTION
● DETECTED VALUES OF OUTLET GAS BY SENSOR
⊙ PRESUMED VALUES AFTER CORRECTION

[NORMAL CONDITION]

EXHAUST GAS PURIFYING APPARATUS

CROSS REFERENCE TO RELATED APPLICATION

This application is based on Japanese Patent Application No. 2004-214641, which is filed on Jul. 22, 2004, the disclosure of which is incorporated herein by reference.

FIELD OF THE INVENTION

The present invention relates to an exhaust gas purifying apparatus for an internal combustion engine having a diesel particulate filter (DPF) in an exhaust pipe, and more particularly relates to the exhaust gas purifying apparatus and a method in which an over-heat of the DPF during a re-generation operation thereof is prevented.

BACKGROUND OF THE INVENTION

An exhaust gas purifying apparatus has become important, in which exhaust gas from an engine is processed by a catalyst or a filter so that emission of harmful components is suppressed in view of environmental protection. An exhaust gas purifying apparatus is known in the art, for example, in which a diesel particulate filter (DPF) is provided in an exhaust pipe of an engine for trapping the particulates emitted from the engine. The DPF is re-generated by periodically burning out accumulated diesel particulates, based on accumulated amount of the diesel particulates which can be presumed from a differential pressure at the DPF.

In such an exhaust gas purifying apparatus, an over-heat of the DPF has become a problem. The over-heat of the DPF may result from a rapid combustion of the accumulated diesel particulates in the DPF, and may cause a problem in that a breakage of the DPF or a deterioration of catalyst supported by the DPF may occur due to a rapid increase of the temperature of the DPF. The over-heat of the DPF may likely occur when temperature of the exhaust gas flowing into the DPF is high during a high load operation of the engine, or when the temperature of the DPF is extremely increased by a temperature increase operation of the DPF for its re-generation operation. As shown in FIG. 6, it is known that the combustion speed of the diesel particulates is exponentially increased, as the temperature of the DPF becomes higher. Accordingly, it is necessary to suppress the temperature of the DPF at a value lower than a predetermined temperature (e.g. 600° C.), in order to avoid the over-heat of the DPF.

It is, however, not possible to directly detect temperatures at an inside of the DPF by a temperature sensor. Temperatures at a front side and a rear side of the DPF can be detected, when temperature sensors are provided at the front and rear sides of the DPF. However, heat generation is taking place in the inside of the DPF due to the combustion of the diesel particulates and unburned hydrocarbons (HC) contained in the exhaust gas, and furthermore, a large time delay is present between the heat generation at the inside of the DPF and a temperature change caused by the heat generation and appeared at the rear side of the DPF, due to a heat capacity of the DPF (see FIG. 3A). It is, therefore, necessary to presume, with a high accuracy, the temperature at the inside of the DPF, since the temperature detected by the temperature sensor can not be simply regarded as the temperature of the DPF, as explained above.

One of methods for presuming the DPF temperature is disclosed in Japanese Patent Publication No. 2003-254038, in which the DPF is treated in a lumped parameter system and heat budget (heat transfer with the exhaust gas, heat generated amount of the diesel particulates, heat generated amount of the hydrocarbons, etc.) of the total DPF is calculated to presume the temperature.

In the DPF made of ceramics as its basic material, it has a characteristic that heat conductivity is low and a heat spot, in which temperature of a part of the DPF is locally increased, is likely to occur. In the case that the temperature of the center portion of the DPF is rapidly increased due to the combustion of the diesel particulates accumulated in such portion, a large temperature difference appears at a time point A of FIG. 3A. In this case, the temperatures of the other portions than the center portion are lower than that of the center portion, as indicated by a solid line in FIG. 3B. The locally increased temperatures are, however, averaged with the other lower temperatures, and therefore, it is not possible to accurately presume a temperature of the DPF by the conventional method, in which the DPF is treated in the lumped parameter system, as shown in FIG. 3B.

SUMMARY OF THE INVENTION

The present invention is made in view of the above problems. It is an object of the present invention to provide an exhaust gas purifying apparatus, in which a temperature of an inside of the DPF can be accurately presumed at multiple points and a maximum temperature among the presumed temperatures at multiple points is controlled to be lower than a predetermined value, so that an over-heat of the DPF can be prevented.

According to a feature of the present invention, temperatures of the DPF are in advance presumed at multiple temperature presuming points and its maximum temperature is controlled to be lower than a predetermined value.

According to another feature of the present invention, a representative temperature of the DPF is calculated from the multiple presumed temperatures at the respective temperature presuming points and the representative temperature is controlled to be lower than a predetermined value.

According to a further feature of the present invention, the temperatures at the respective temperature presuming points are corrected based on a detected temperature at a front or a rear side of the DPF, so that the temperature of the DPF can be more accurately presumed.

According to a further feature of the present invention, the temperatures at the respective temperature presuming points are presumed from the exhaust gas information, such as an amount and temperature of the exhaust gas flowing into the DPF, and from the internal information, such as a presumed accumulated amount of the diesel particulates in the DPF.

According to a further feature of the present invention, the DPF is hypothetically divided into multiple cells in a gas flow direction, and a heat budget for the respective cells is calculated so that the temperatures at the respective temperature presuming points are presumed.

According to a further feature of the present invention, number of temperature presuming points in a front half of the DPF is made larger than that in a rear half of the DPF.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

An exhaust gas purifying apparatus for a diesel engine, to which the present invention is applied, is explained with reference to the drawings.

Figure 1:
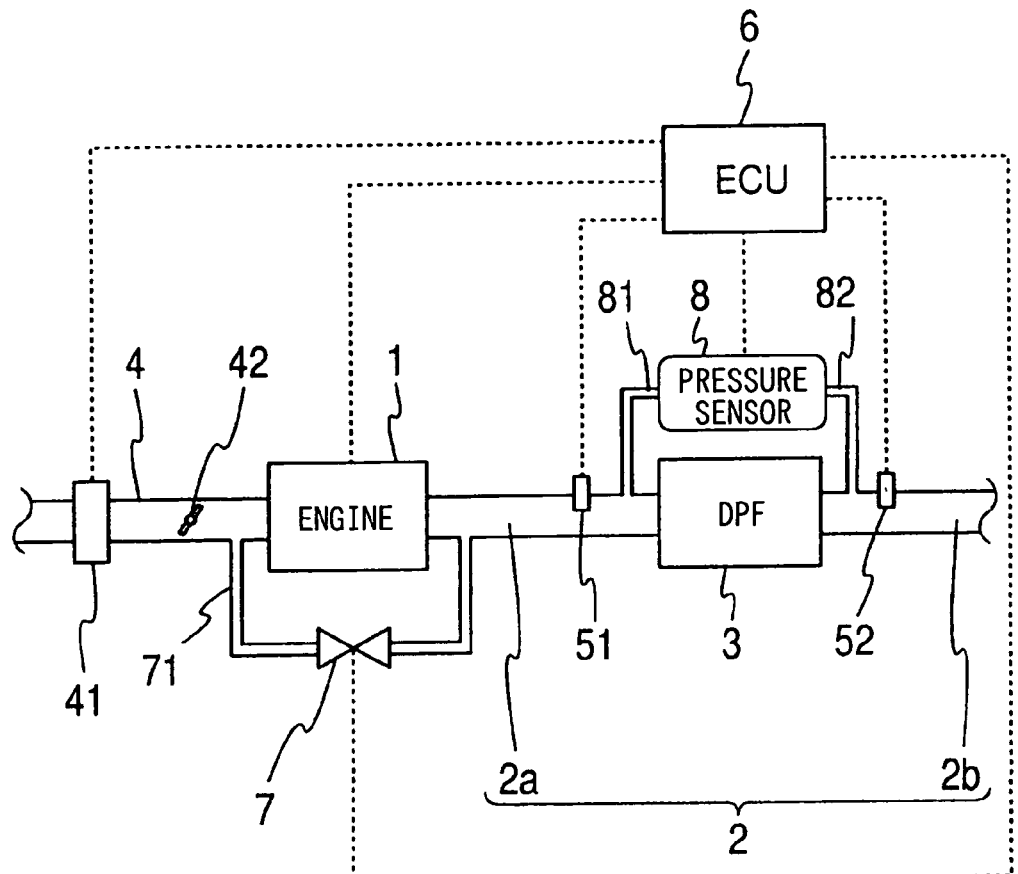
FIG. 1 is a schematic view showing an exhaust gas purifying system according to an embodiment of the present invention.

FIG. 1 is a schematic view showing an exhaust gas purifying system according to an embodiment of the present invention. A diesel particulate filter (hereinafter also referred to as DPF) is provided between exhaust gas pipes 2a and 2b, forming an exhaust gas passage 2 of a diesel engine 1. The DPF 3 is a ceramic filter having a well-known structure, for example a honeycomb structure formed from a heat-resisting ceramic, such as cordierite or the like, and having multiple cells for forming gas passages, wherein inlet sides and outlet sides of the cells are alternately closed. The exhaust gas from the engine 1 flows toward a downstream side, passing through porous portioning walls of the DPF 3. The diesel particulates (PM) are trapped by and gradually accumulated in the DPF 3.

An oxidation catalyst is generally supported by the DPF 3. Hydrocarbons (HC) supplied to the exhaust passage 2 is thereby catalytic combusted and the temperature of the exhaust gas is increased to heat the DPF 3. The use of the catalysis (catalytic reaction) has an advantage in that the temperature increase can be effectively performed with a smaller amount of fuel. The oxidation catalyst may not be necessarily provided, or may be arranged as a separate catalyst provided at an upstream side of the DPF 3.

Exhaust gas temperature sensors 51 and 52 are respectively provided in the exhaust gas pipes 2a and 2b, which are provided at the upstream and downstream side of the DPF 3. The temperature sensors 51 and 52 are connected to an electronic control unit (ECU) 6, so that the temperatures of the exhaust gas at the inlet side and outlet side of the DPF 3 are detected and outputted to the ECU 6. An air flow meter 41 is provided in an intake manifold 4 of the engine 1 to output a detected amount of the intake air to the ECU 6. A throttle valve 42 is provided in the intake manifold 4 and at a downstream side of the air flow meter 41, to control (increase or decrease) an amount of the intake air in accordance with a command signal from the ECU 6. The intake manifold 4 is operatively connected to the exhaust pipe 2a through an EGR pipe 71, in which an EGR valve 7 is provided to control an amount of the exhaust gas (an EGR amount) to be re-circulated into the intake manifold in accordance with a command signal from the ECU 6.

A differential pressure sensor 8 is provided to the exhaust pipes 2a and 2b, for detecting a differential pressure at the DPF 3, so that an amount of the trapped diesel particulates (an accumulated amount of PM) in the DPF 3 can be detected. The differential pressure sensor 8 is connected at its one end to the exhaust pipe 2a and at its other end to the exhaust pipe 2b, respectively through pipe portions 81 and 82, and outputs a signal corresponding to the differential pressure to the ECU 6.

Various sensors (not shown), such as a sensor for an acceleration pedal, a sensor for an engine rotational speed, and so on are connected to the ECU 6, which detects an operational condition of the engine and calculates an optimal fuel injection amount, fuel injection timing, fuel injection pressure and so on, to control the fuel injection for the engine 1. The intake air amount is controlled by an adjustment of the opening degree of the throttle valve 42, and the EGR amount is controlled by an adjustment of the opening degree of the EGR valve 7.

The ECU 6 also controls a re-generation of the DPF 3. The ECU 6 controls to increase the temperature of the DPF 3 based on a presumed PM accumulated amount of the diesel particulates, which can be presumed, for example, from the differential pressure of the DPF 3 detected by the sensor 8, so that the accumulated diesel particulates are burned out. A post injection, a retarded fuel injection timing, a throttling of the intake air by the throttle valve 42, or an increase of the EGR amount by the EGR valve 7 can be used as a means for increasing the temperature of the DPF 3. In such an engine having an intercooler for the intake air, the increase of the DPF temperature can be performed in a way that the intake air bypasses the intercooler. The unburned hydrocarbons are supplied to the exhaust passage 2 by the above controls, the temperature of the exhaust gas is further increased due to a heat generation through the oxidation reaction, or the exhaust gas emitted from the engine 1 is increased, with a result that the high temperature exhaust gas is supplied to the DPF 3. The method for increasing the temperature of the exhaust gas can be selected from one of the above methods or as a combination of those multiple methods.

According to the present invention, the temperature of the DPF 3 at different points is presumed and thereby the maximum temperature of the inside of the DPF 3 is presumed from the temperature distribution information, in order to prevent an over-heat of the DPF 3 (This corresponds to a maximum temperature presuming means). The over-heat is prevented in such a manner that the above (presumed) maximum temperature is controlled to be lower than a predetermined re-generation target temperature (This corresponds to a temperature control means).

Figure 2:
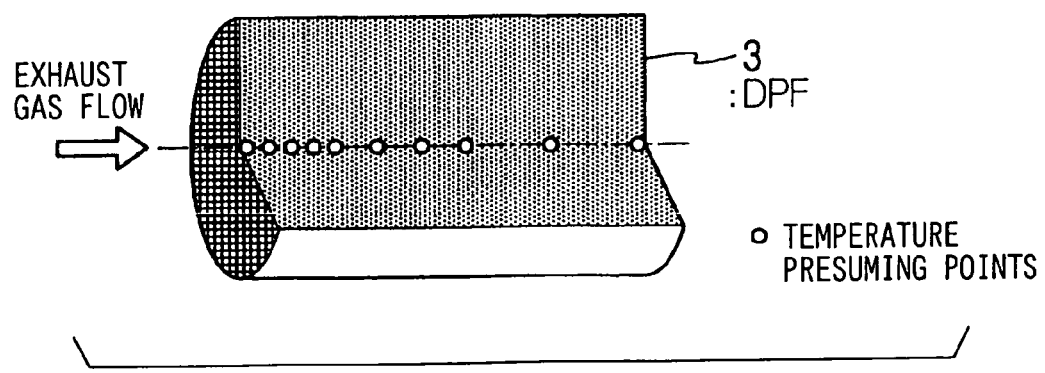
FIG. 2 is a schematic perspective view showing a diesel particulate filter (DPE), in which positions of ten temperature presuming points are indicated.

According to the embodiment of the present invention, the temperature of the DPF 3 is in advance presumed by the temperature presumption at ten (10) different points (temperature presuming points), as shown in FIG. 2, so that a local temperature increase in the inside of the DPF 3 can be detected. The temperature presuming points are arranged in the DPF 3 along a line of the exhaust gas flow. This is because the temperature difference in a circumferential direction is small since the temperature difference is generated only by the heat conduction, whereas the temperature difference in the gas flow direction is large since the heat quantity in the inside of the DPF 3 may move from the front side to the rear side along with the exhaust gas flow.

The temperature presumption at a front half portion of the DPF 3 is made more intensively than that at a rear half portion. This is for the purpose of decreasing an error in a modeling system, by increasing the number of the temperature presuming points in the front half portion at which a temperature change is larger than the rear half portion.

Figure 3A:
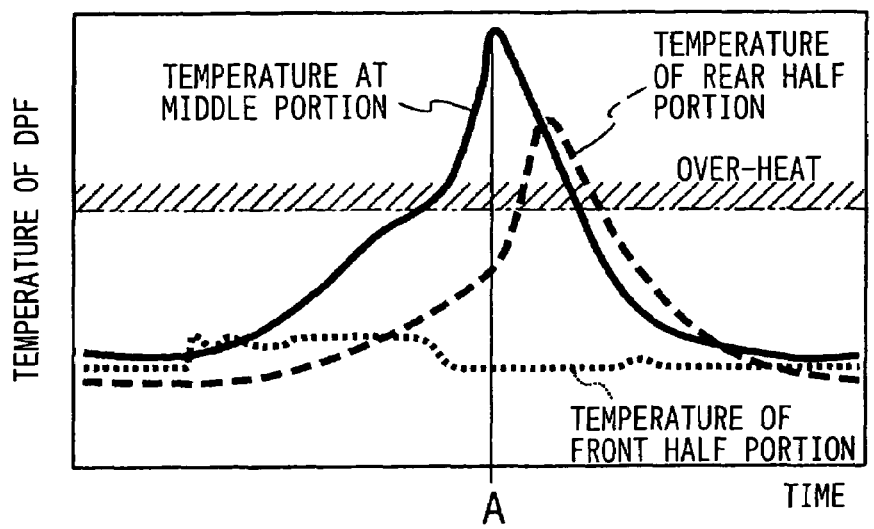
FIG. 3A is a time chart showing temperature changes of the DPF in case of an over-heat thereof.
Figure 3B:
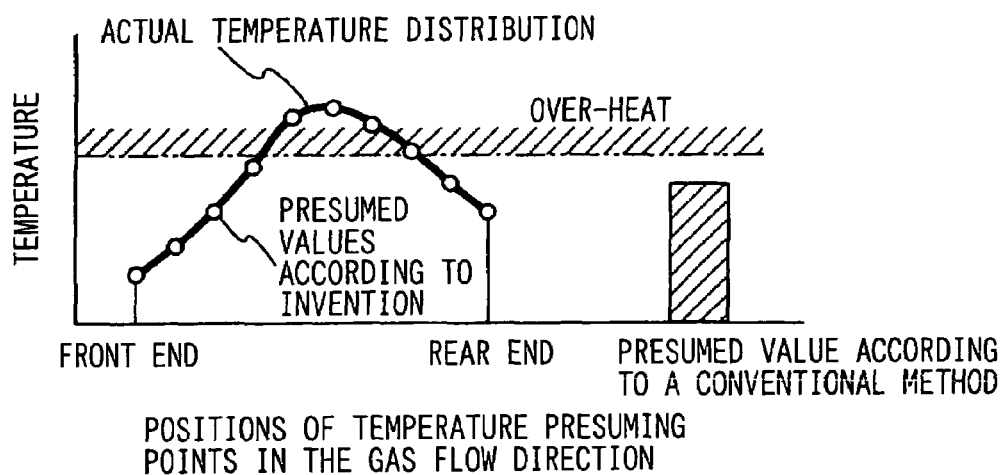
FIG. 3B is a graph showing a temperature distribution as well as presumed temperatures according to the present invention, with respect to a gas flow direction, and further showing a presumed value according to a conventional method.

FIG. 3A shows temperature changes at three different portions, i.e. at the front half portion, the rear half portion and the middle portion, with respect to a time. As shown in FIG. 3A, the temperature distribution in the inside of the DPF 3 are largely different from the portion to the portion in the gas flow direction, due to the time delay of the temperature changes or the inside heat generation. The temperature distribution can be, however, precisely presumed from the temperatures at the multiple presuming points, as shown in FIG. 3B.

Figure 4A:
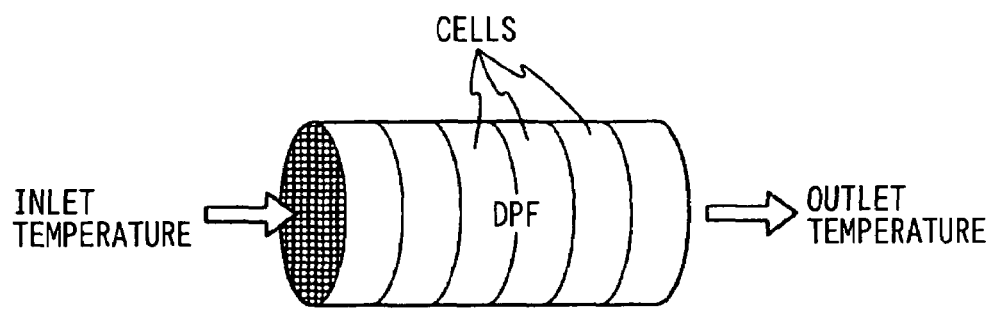
FIG. 4A is a schematic perspective view showing the DPF, which is hypothetically divided into multiple cells.
Figure 4B:
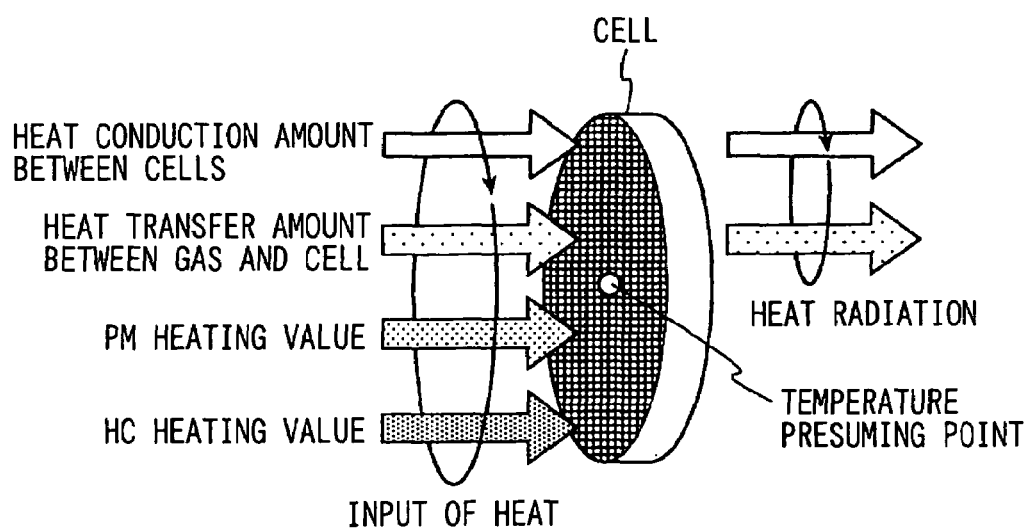
FIG. 4B is a schematic perspective view showing one of the divided cells, and showing schematically a calculation of heat budget for the cell.
Figure 5:
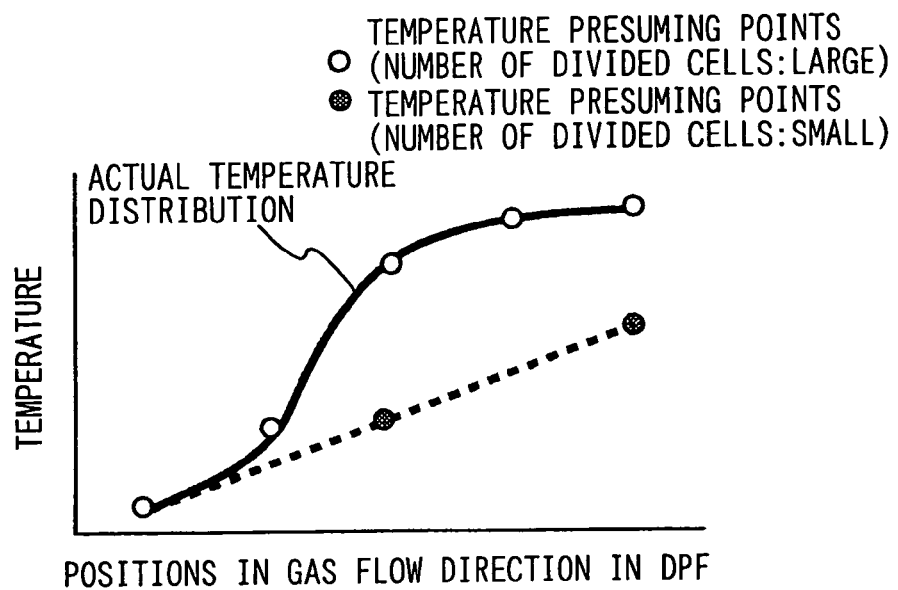
FIG. 5 is a schematic graph showing a temperature distribution with respect to the direction of the gas flow, and showing that presumption accuracy is increased when the number of divided cells becomes larger.

More specifically, the DPF 3 is hypothetically divided into multiple sections (hereinafter also referred to as the cell), so that each of the temperature presuming points is included in each of the cells, as shown in FIG. 4A. As shown in FIG. 4B, a presumed value at the respective temperature presuming points is presumed by calculating a heat budget for the respective cells. In the calculation of the heat budget, a heat transfer amount between the cell and the gas flowing through the cell, a heat conduction amount between the cells, a HC heating value by heat generation of the hydrocarbons in the cell, and a PM heating value by the exhaust gas are calculated. A heat quantity, which is given from and received by the cell, is calculated from the total heat amount. Then, the temperature is presumed by calculating temperature increase amount from the heat capacity of the cell. As shown in FIG. 5, a presuming accuracy is increased more, as the number of the divided cells is larger, so that the presumed temperatures come closer to an actual temperature distribution. According to the present invention, the DPF 3 is hypothetically divided into ten (10) cells, corresponding to the ten temperature presuming points.

As above, the temperatures at the respective temperature presuming points can be presumed from the exhaust gas information (the outside information), such as the heat transfer amount between the cell and the exhaust gas, and from the inside information of the DPF 3, such as the heat generated by combustion of the diesel particulates in the DPF 3. Since the temperatures at the respective points vary depending on the above mentioned outside parameters and the inside parameters, the temperatures are presumed from those outside and inside parameters.

In the calculation of the heat transfer amount between the cell and the gas flowing through the cell, such a heat transfer coefficient is used, with which the temperature of the cell and the temperature of the gas become equal to each other. The heat transfer coefficient is generally represented as a function of the flow velocity. However, in the case of the DPF, the contact area with the gas is large and thereby the heat transfer can be sufficiently done within a flow rate range of the exhaust gas flow of the general engine. Therefore, in most cases, the temperature of the cells becomes equal to that of the exhaust gas. In such a case, the heat transfer coefficient, with which the temperatures of the cells and the exhaust gas become equal to each other, is used, so that the calculation process becomes simpler.

Figure 6:
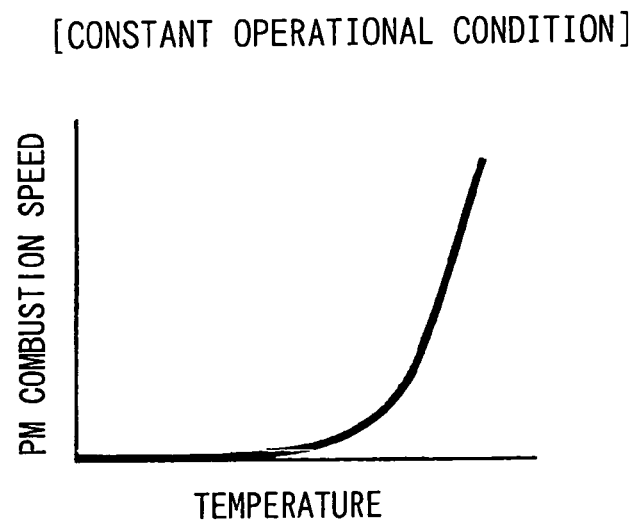
FIG. 6 is a schematic graph showing a combustion speed of the diesel particulates (PM) with respect to the temperature.

The maximum temperature presumed from the temperature distribution presumed in the above manner is so controlled to be lower than such a temperature, at which a rapid combustion of the diesel particulates may not occur, as shown in FIG. 6. More preferably, a representative temperature of the DPF 3 is calculated from the presumed temperature distribution (this corresponds to a representative temperature calculating means), and a temperature increase operation is controlled by the temperature increase means (this corresponds to a temperature increase control means), so that the representative temperature becomes close to the desired target re-generation temperature.

This is because the large temperature difference is generated in the inside of the DPF 3 and the over-heat may happen even when the temperature of the specific portion of the DPF 3 is controlled at a predetermined value, namely the over-heat may happen at the other portions of the DPF 3.

Figure 8:
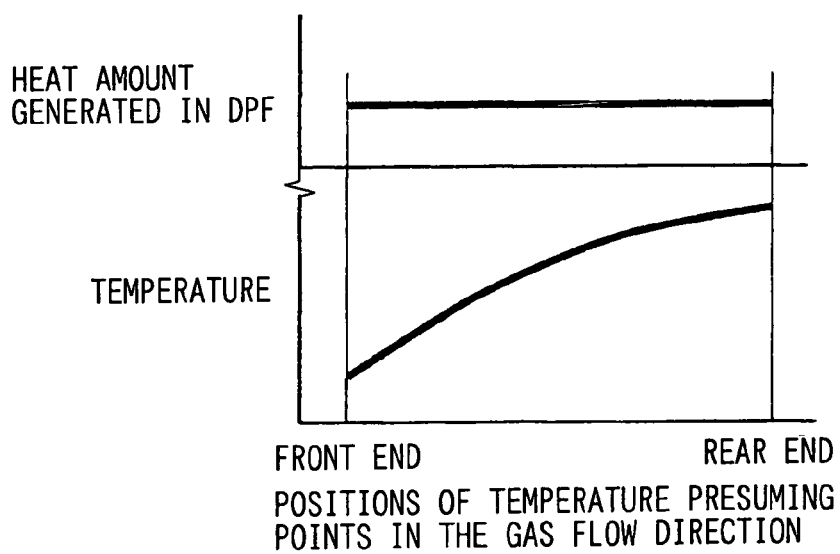
FIG. 8 is also a schematic graph showing temperatures of the DPF, with respect to the direction of the gas flow, and showing that the temperature of the DPF becomes higher at points which are located at a more downstream side, even when heat quantity generated at the inside of the DPF is constant.
Figure 9:
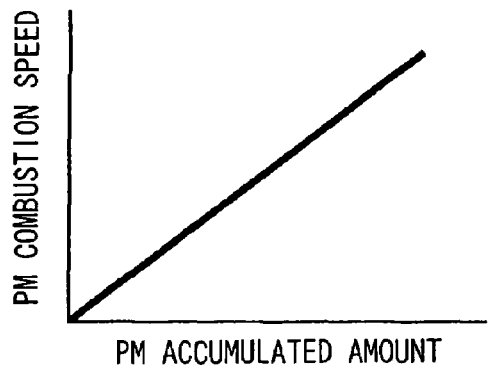
FIG. 9 is a further schematic graph showing the PM combustion speed with respect to the PM accumulated amount, and showing that the PM combustion speed becomes higher when the PM accumulated amount becomes larger.

This is further because the temperature becomes higher at a more downstream side of the DPF 3, as shown in FIG. 8, even when the heat quantity generated inside of the DPF 3 is constant at each portion, and because it takes a time until the heat at the front end portion is transferred to the downstream side. And furthermore, it is because an over-increase of the temperature (the over-heat) is likely to occur, as the PM accumulated amount of the diesel particulates becomes larger, as shown in FIG. 9. However, such over-increase of the temperature (the over-heat) can be surely prevented, when the representative temperature is decided through consideration of the above facts and the temperature is controlled based on the representative temperature.

Figure 7:
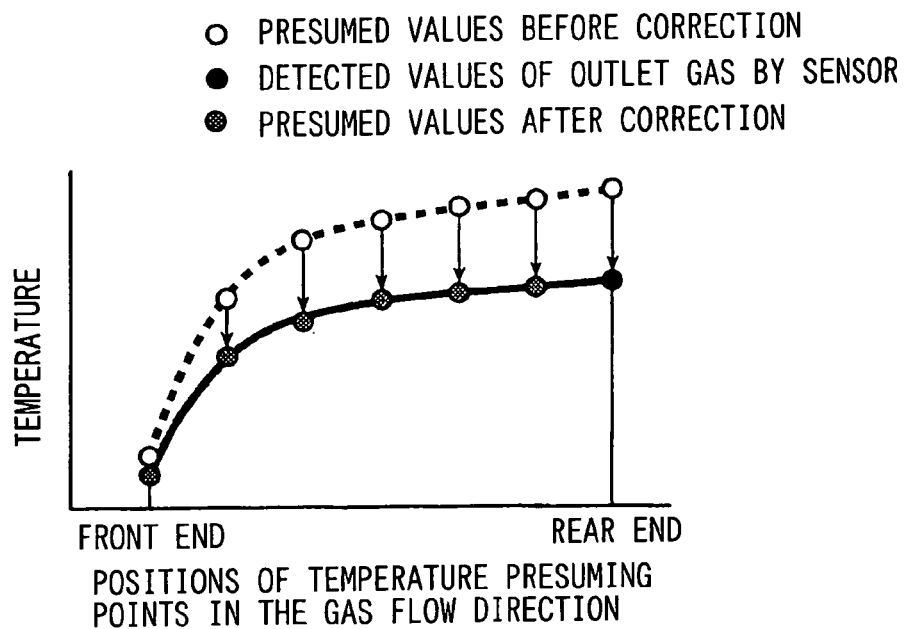
FIG. 7 is a schematic graph showing a method for correcting presumed temperatures presumed based on detected temperatures by an exhaust gas temperature sensor.

The presumed temperatures can be corrected, as shown in FIG. 7, based on at least one of the input temperature at the front end of the DPF 3 and the output temperature at the rear end of the DPF 3, respectively detected by the temperature sensors 51 and 52, so that the presumption accuracy can be improved. In this correction process, an amount of correction at the respective points is so made that the correction amount is larger as the presuming point is closer to the temperature sensor, as shown in FIG. 7, in which the correction amount is decided based on the temperature at the temperature sensor 52 of the rear side of the DPF 3.

Figure 10:
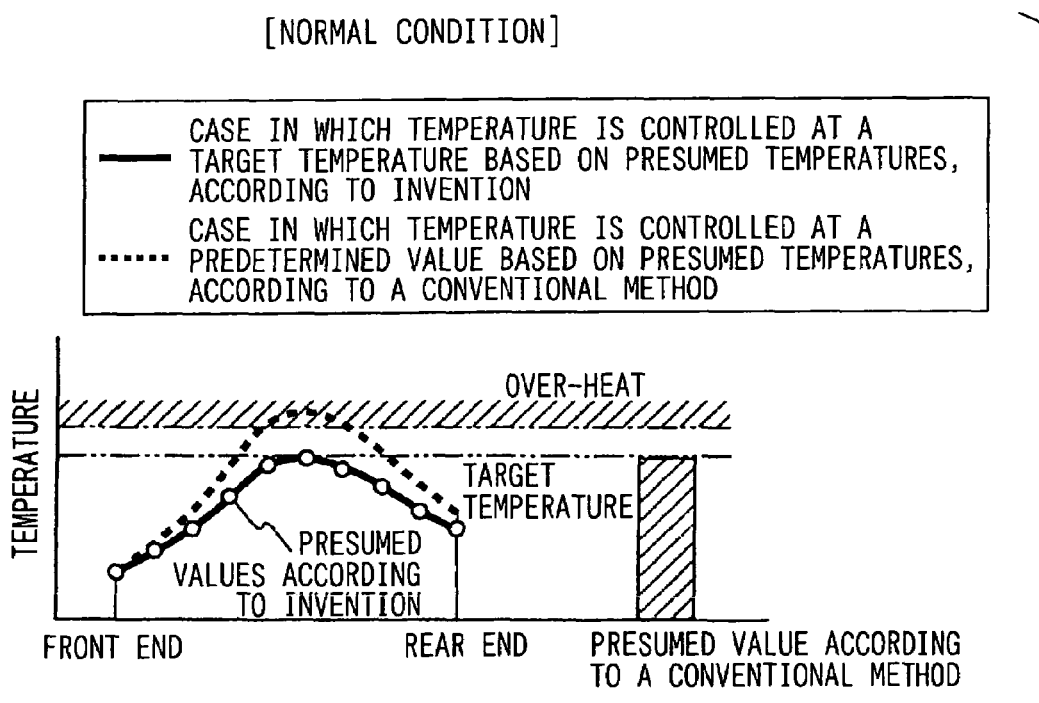
FIG. 10 is a graph showing the temperature of the DPF at the respective temperature presuming points, and showing the over-heat of the DPF can be prevented at all portions (all cells) when a maximum temperature among the presumed temperatures at multiple points is controlled at a target temperature.

As above, the maximum temperature among the presumed temperatures at the multiple points is controlled to be lower than the predetermined target re-generation temperature, as shown in FIG. 10, and thereby the over-heat of the all portions of the DPF 3 can be prevented.

More preferably, the representative temperature calculated from the presumed temperature distribution is controlled to be lower than the predetermined target re-generation temperature.

The PM accumulated amount of the diesel particulates can be calculated based on the differential pressure at the DPF 3 detected by the sensor 8, the exhaust gas amount to be calculated from the intake air amount detected by the air flow meter 41, and the temperature distribution presumed in the above described manner (this corresponds to an accumulated particulate amount presuming means). The exhaust gas amount (volumetric amount) is a function of the gas temperature flowing through the DPR 3, and an accurate volumetric gas amount can not be calculated in the case that the temperature difference is in the inside of the DPF 3. However, the accurate volumetric gas amount can be calculated, when the volumetric gas amount is corrected based on the temperature distribution information of the DPF 3. The target re-generation temperature is preferably selected at such a value, which is high as much as possible within a range of not causing the over-heat, so that the safety and the improvement of the fuel consumption ratio can be both realized. More preferably, the target re-generation temperature is selected at a lower value, as the temperature at the rear end of the DPF 3 becomes higher, based on the presumed temperature distribution.

Figure 11:
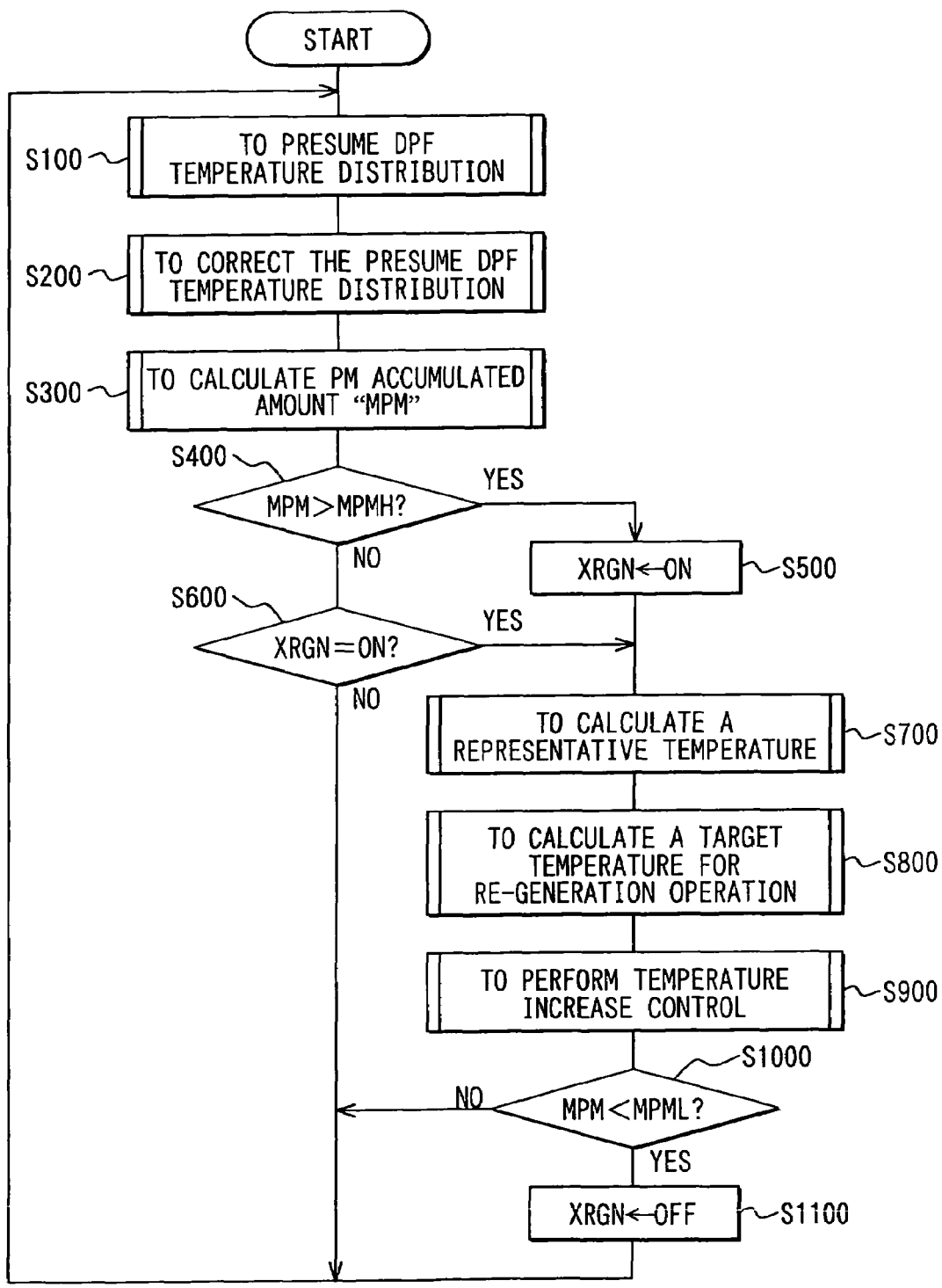
FIG. 11 is a flow chart showing a basic process of a re-generation operation by an ECU according to the present invention.

FIGS. 11 to 16 show flow charts to be performed by the ECU 6 in the present embodiment. FIG. 11 is a flow chart showing a basic operation for the temperature presumption and the re-generation control for the DPF 3.

Figure 12:
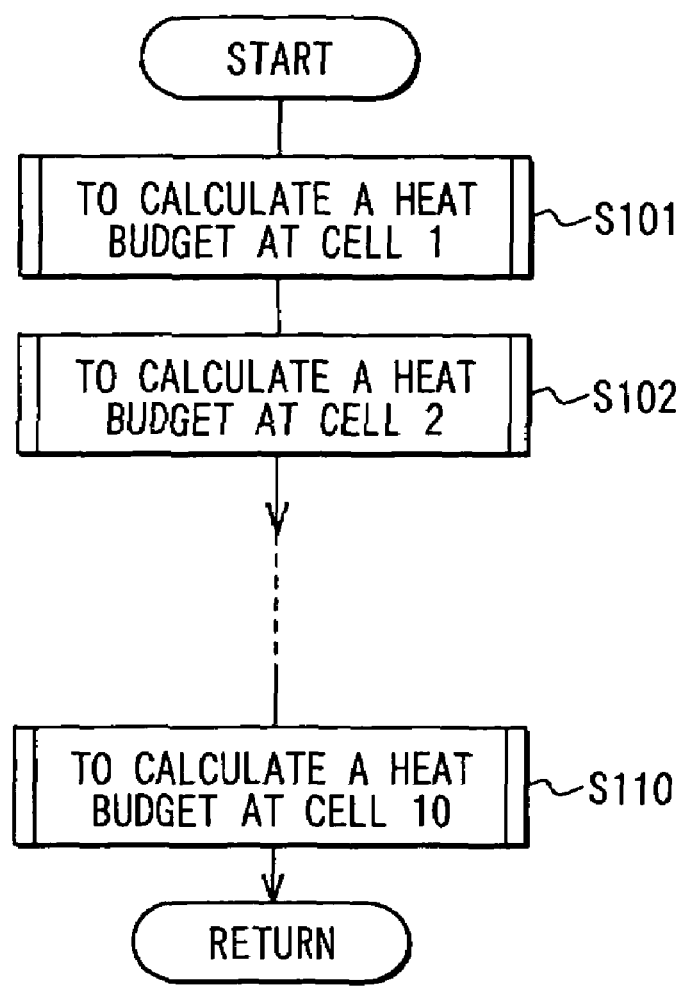
FIG. 12 is a flow chart showing a process for calculating the heat budget for the respective cells.

At first, the temperature distribution in the inside of the DPF 3 is presumed at a step S100. FIG. 12 shows a detailed flow chart for the process of presuming the temperature distribution, wherein the heat budget for the respective cells, i.e. for the ten (10) cells as divided in FIG. 4, are calculated at each steps of S101 to S110, based on the ten (10) temperature presuming points provided in the DPF 3 as in FIG. 2.

Figure 13:
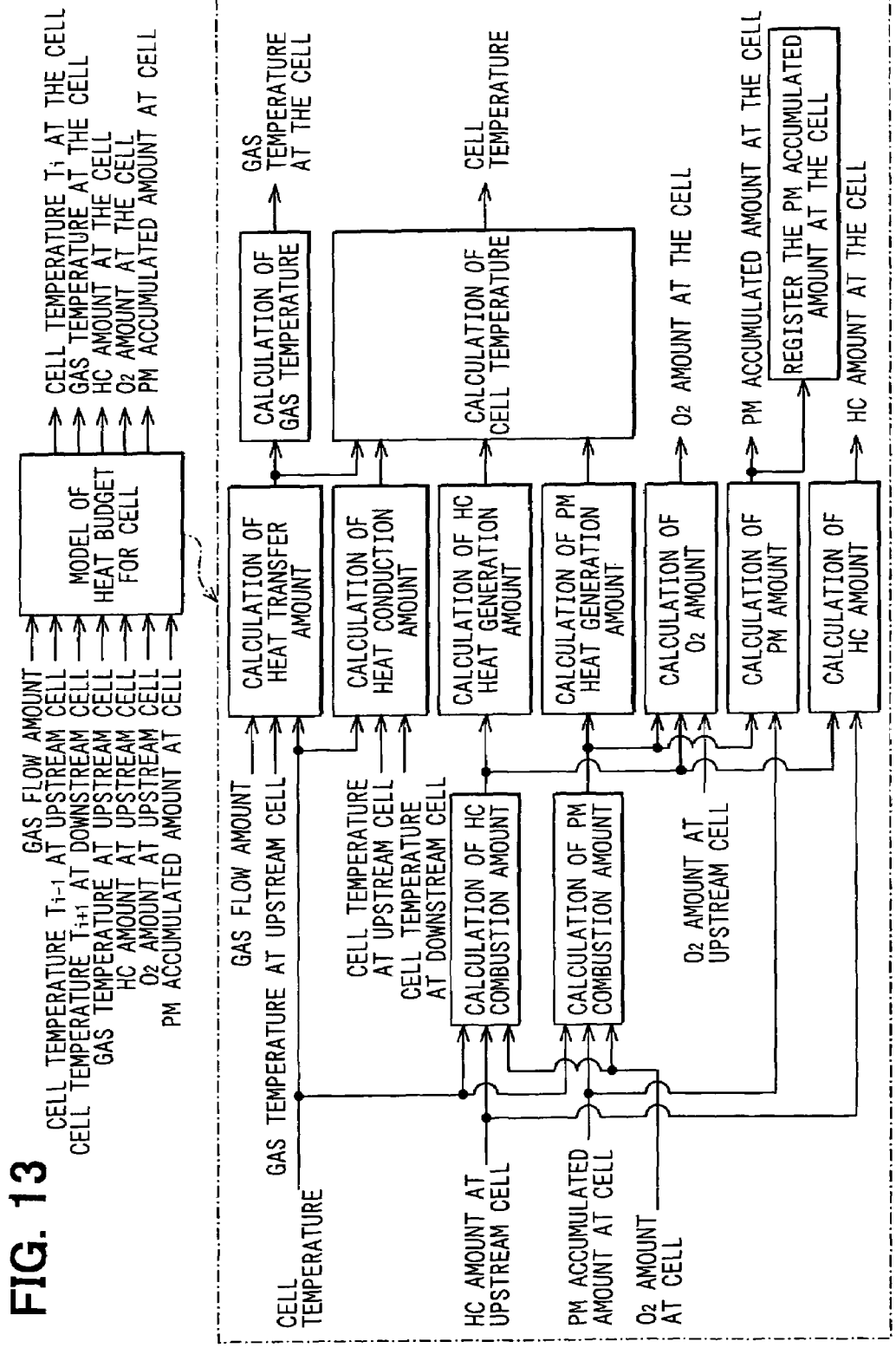
FIG. 13 is a schematic diagram of a modeling system for calculating the heat budget.

The heat budget for the respective cells is calculated by use of a modeling system for the heat budget shown in FIG. 13. The modeling system of FIG. 13 is the modeling system of (i)-th cell counted from the front end of the DPF 3.

The heat transfer amount between a basic DPF material of the cell and the gas flowing through the cell, the HC heating value by heat generation of the hydrocarbons in the cell, the PM heating value by the exhaust gas, and the heat conduction amount between the adjacent cells (which are the (i−1)-th cell and the (i+1)-th cell) based on the temperatures of the basic dell material, are calculated. The temperature increase amount is calculated from the heat quantity which is given from and received by the cell, and the heat capacity of the cell. Then, a temperature "Ti" of the basic cell material is calculated. At the same time, HC decrease amount, PM decrease amount and O2 consumption amount are calculated to register the PM accumulated amount "MPMi" for the respective cells.

The input heat quantity and the radiated heat quantity can be calculated from the exhaust gas information, such as the amount and temperature of the exhaust gas flowing through the DPF 3. In the case that the amount of the unburned hydrocarbons is increased during the re-generation operation of the DPF 3, it is necessary to take the amount of the unburned hydrocarbons into consideration in addition to the exhaust gas information, since the temperature increase becomes larger due to the heat generation by the unburned hydrocarbons. The heat quantity generated in the inside of the DPF 3 can be calculated from the inside information of the DPF 3, such as the presumed temperatures at the respective points, the amount of the hydrocarbons, the amount of the accumulated diesel particulates. The combustion speeds of the hydrocarbons and the diesel particulates vary depending on the temperature of the DPF 3. Accordingly, the amount of the temperature increase to be caused by the heat generations of the hydrocarbons and the diesel particulates at the respective temperature presuming points is calculated based on the presumed temperatures at the respective points. Since the combustion speeds of the hydrocarbons and the diesel particulates further vary depending on the hydrocarbons density and the accumulation density of the diesel particulates, more accurate temperature presumption can be possible, when the amount of the hydrocarbons and the accumulated amount of the diesel particulates for the respective temperature presuming points are individually calculated.

The above calculation for the heat budget is performed for the respective cells, to calculate the temperatures "T1" to "T10" of the basic cell materials, wherein the temperature "T1" is the presumed temperature at the cell of the front end, whereas the temperature "T10" is the presumed temperature at the cell of the rear end. The gas flow amount, the gas temperature at the upstream side of the cell 1, and the HC amount at the upstream side of the cell 1 are, respectively calculated from the detected amount of the air flow meter 41, the upstream temperature sensor 51, and the operational condition.

Figure 14A:
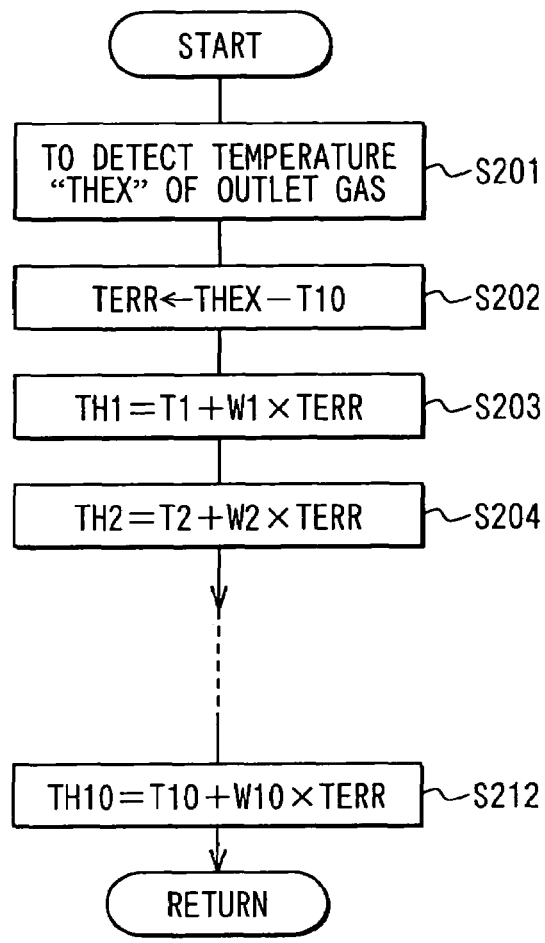
FIG. 14A is a flow chart showing a process for correcting the presumed temperatures.
Figure 14B:
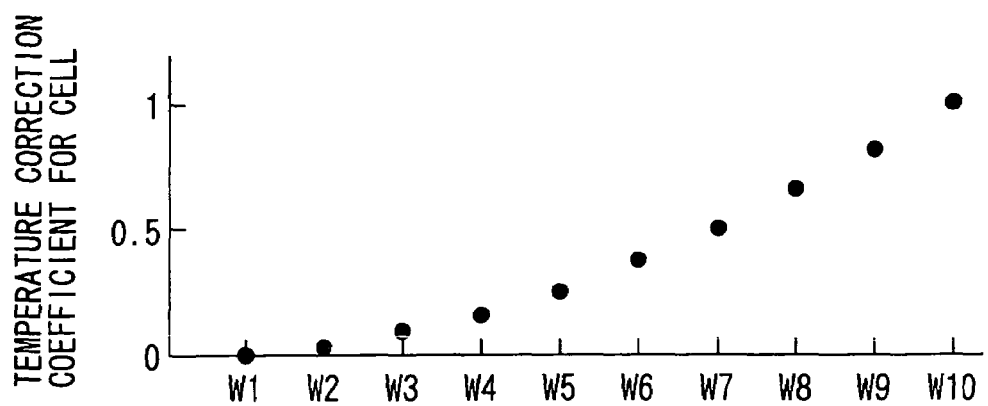
FIG. 14B is a graph showing a temperature correction coefficient at the respective cells, for correcting temperatures of the basic cell materials.

The presumed temperatures "T1" to "T10" are corrected, at a step S200 in FIG. 11, based on a detected temperature "THEX" of the outlet gas from the DPF 3 detected by the downstream temperature sensor 52. FIG. 14 shows a detailed flow chart for processing the correction of the presumed temperatures "T1" to "T10", wherein a deviation "TERR" between the presumed temperature "T10" of the cell of the DPF rear end and the detected temperature "THEX" of the outlet gas is calculated at a step S202, and then corrected temperatures "TH1" to "TH10" of the respective cells are calculated by use of the above deviation "TERR", at steps S203 to S212. The corrected temperature for the respective cells is calculated in such a manner that the presumed temperature "Ti" at the (i)-th cell is multiplied by the deviation "TERR" and a correction coefficient "Wi", which is set at the respective cells ("Wi" is the correction coefficient for the (i)-th cell). As shown in FIG. 14B, the correction coefficient "Wi" is larger, as the corresponding cell is closer to the rear end of the DPF, namely closer to the downstream temperature sensor 52.

The PM accumulated amount "MPM" is calculated (presumed), at a step S300 in FIG. 11, from the differential pressure at the DPF 3 and the exhaust gas amount, wherein the differential pressure is detected by the pressure sensor 8 and the exhaust gas amount is calculated from the detected value at the air flow meter 41.

The PM accumulated amount "MPM" is presumed, as above, from the differential pressure at the DPF 3 and the exhaust gas amount. In this presumption method, a relationship between the differential pressure at the DPF 3 and the exhaust gas volumetric amount flowing through the DPF 3 is in advance investigated, and the PM accumulated amount "MPM" is presumed based on such relationship. The volumetric amount of the exhaust gas is a function of the temperature of the exhaust gas flowing through the DPF, and therefore, the volumetric amount may not be accurately calculated, when there is a temperature difference in the inside of the DPF.

Accordingly, in the calculation of the exhaust gas volumetric amount, it is corrected by the corrected temperatures "TH1" to "TH10" calculated at the step S200, so that the accurate volumetric amount for the exhaust gas can be calculated.

The PM accumulated amount "MPM" thus calculated, can be further corrected by use of the PM accumulated amounts "MPM1" to "MPM10", which are the values calculated in the previous process.

The PM accumulated amount "MPM" calculated at the step S300 is compared with a PM accumulated value "MPMH" for the re-generation of the DPF 3, at a step S400. In the case that the PM accumulated amount "MPM" is larger than the PM accumulated value "MPMH" for the re-generation, it is determined that the re-generation operation is necessary, and the process goes to a step S500. In the case that the PM accumulated amount "MPM" is smaller than the PM accumulated value "MPMH" for the re-generation, the process goes to a step S600. A flag "XRGN" for performing the re-generation operation is made "ON" at the step S500, and the process further goes to a step S700, at which the re-generation operation is started. At the step S600, it is determined whether the flag "XRGN" for performing the re-generation operation is "ON" or not, and the process goes to the step S600 when the flag "XRGN" for performing the re-generation operation is "ON". In the case that the flag "XRGN" for performing the re-generation operation is not "ON" (i.e. "OFF"), at the step S600, the process is ended, without performing the re-generation operation.

Figure 15A:
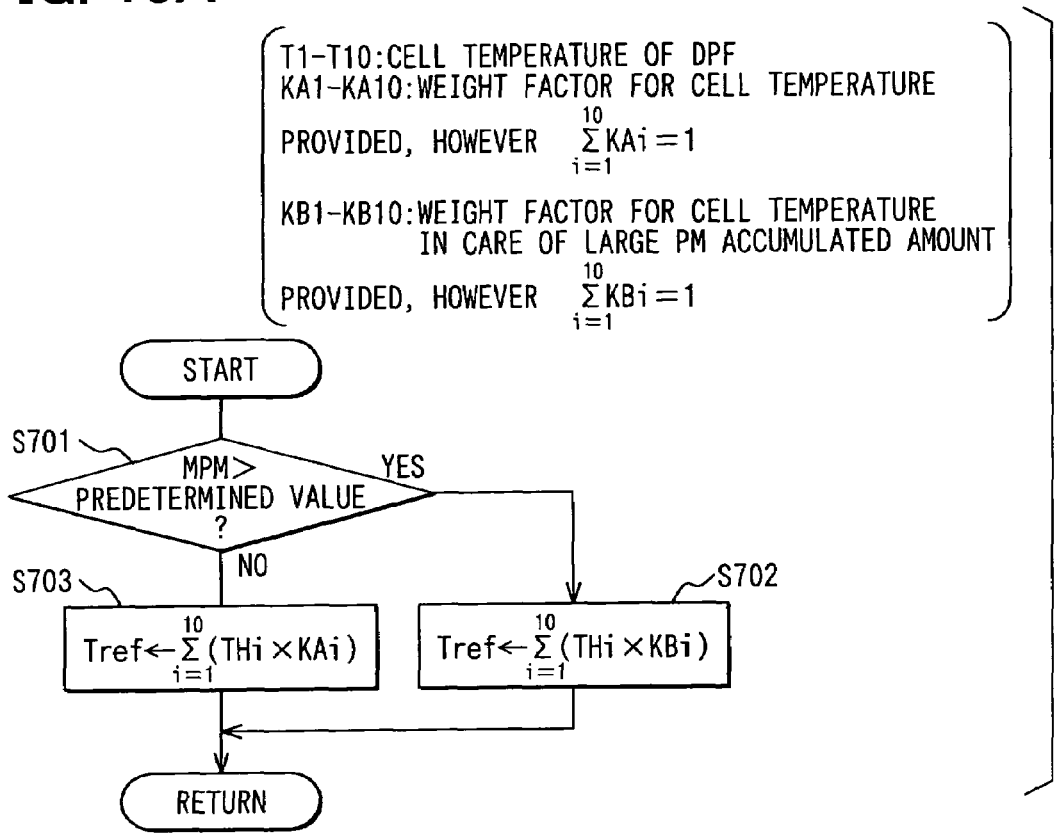
FIG. 15A is a flow chart showing a process for calculating a representative temperature of the DPF.
Figure 15B:
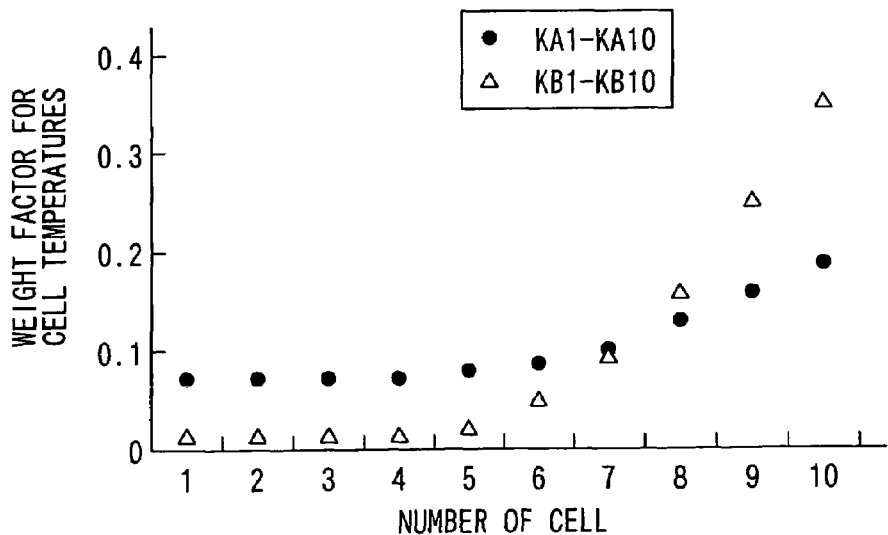
FIG. 15B is a graph showing a weight factor for the respective cells, which is used when calculating the representative temperatures.

The representative temperature "Tref" is calculated at the step S700. A process for calculating the representative temperature "Tref" is shown in FIG. 15A. The PM accumulated amount "MPM" is compared, at a step S701, with a predetermined value, which is larger than the PM accumulated value "MPMH" for the re-generation. In the case that the PM accumulated amount "MPM" is larger than the predetermined value, the process goes to a step S702, at which the representative temperature "Tref" of the case, in which the PM accumulated amount is large, is calculated. On the other hand, in the case that the PM accumulated amount "MPM" is smaller than the predetermined value, the process goes to a step S703, at which the representative temperature "Tref" of the case, in which the PM accumulated amount is small, is calculated. More specifically, the representative temperature is obtained in a linear combination, namely, it is calculated in such a manner that the presumed temperature for the respective presuming points is multiplied by a weight factor corresponding to a position of the respective presuming points.

At the step S702, the representative temperature "Tref" of the case, in which the PM accumulated amount is large, is calculated as mentioned above. In the case that the PM accumulated amount "MPM" is relatively large, the representative temperature is preferably calculated so that a more priority is given to the rear portions of the DPF 3 by making the weight factor for the rear portions larger. This is because the combustion speed would become faster and a risk of the possible over-heat of the DPF would become higher, in the case of the relatively large PM accumulated amount "MPM". Namely, the corrected temperatures "TH1" to "TH10" of the cells calculated in the steps S203 to S212 of FIG. 14A are multiplied by the weight factors "KB1" to "KB10" shown in FIG. 15B, to obtain the representative temperature "Tref".

At the step S703, the representative temperature "Tref" of the case, in which the PM accumulated amount is small, is calculated in the same manner. In the case that the PM accumulated amount "MPM" is relatively small, the representative temperature "Tref" is preferably calculated, in which the temperatures of the whole DPF 3 is reflected by making a difference between the neighboring weight factors smaller than that of the case of the large PM accumulated amount. Namely, the corrected temperatures "TH1" to "TH10" of the cells calculated in the steps S203 to S212 of FIG. 14A are multiplied by the weight factors "KA1" to "KA10" shown in FIG. 15B, to obtain the representative temperature "Tref".

Figure 16:
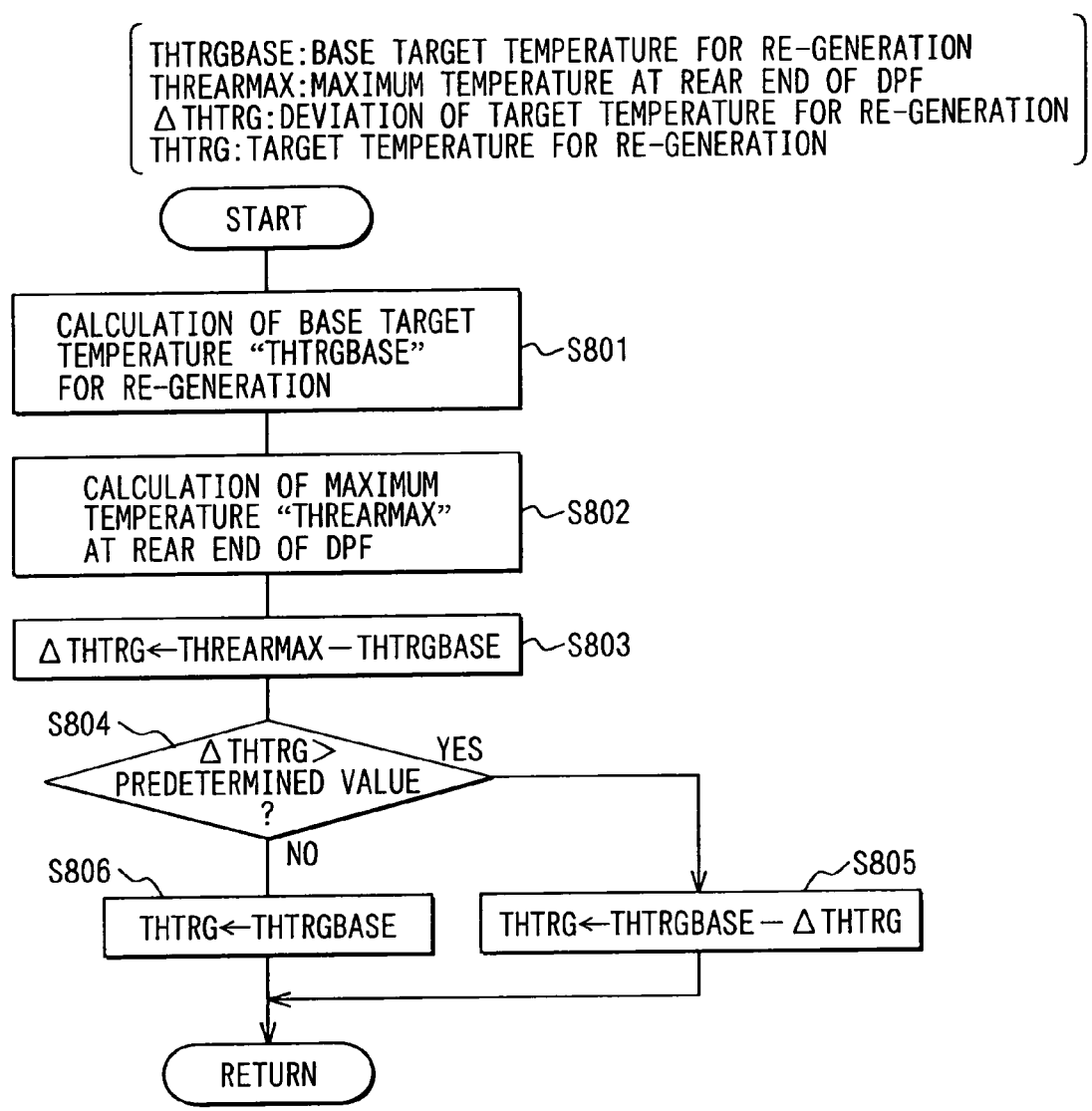
FIG. 16 is a flow chart showing a process for calculating a target temperature for a re-generation operation.

The target temperature "THTRG" for the re-generation operation is calculated in a step S800 of FIG. 11. The target temperature "THTRG" is made smaller, as the temperature at the rear portions of the DPF 3 is higher, so that a safety can be increased with respect to the over-heat. A detailed process of this step S800 is shown in FIG. 16. A base target temperature "THTRGBASE" for the re-generation operation is at first calculated at a step S801. At a step S802, a maximum value among the corrected temperatures "TH7" to "TH10" of the cells is selected as the maximum temperature "TRREARMAX" at the rear portions of the DPF 3. Then, at a step S803, a deviation "ΔTHTRG" between the base target temperature "THTRGBASE" for the re-generation operation and the maximum temperature "TRREARMAX" at the rear portions of the DPF 3 is calculated. At a step S804, the deviation "ΔTHTRG" is compared with a predetermined value. In the case that the deviation "ΔTHTRG" is larger than the predetermined value, the process goes to a step S805, at which the target temperature "THTRG" for the re-generation operation is made lower. In the case that the deviation "ΔTHTRG" is smaller than the predetermined value, the process goes to a step S806.

At the step S805, the target temperature "THTRG" for the re-generation operation is calculated in accordance with the following formula (1):

$$\text{"THTRG"} = \text{"THTRGBASE"} - \text{"ΔTHTRG"} \quad (1)$$

At the step S806, the target temperature "THTRG" for the re-generation operation is calculated in accordance with the following formula (2):

$$\text{"THTRG"} = \text{"THTRGBASE"} \quad (2)$$

At a step S900 of FIG. 11, the temperature increase operation is performed in such a manner that the representative temperature "Tref" calculated at the step S700 can be maintained at around the target temperature "THTRG" for the re-generation operation calculated at the step S800. The temperature increase operation is performed, for example, by increasing an amount of the unburned HC (hydrocarbons) by the post injection and thereby increasing the temperature of the DPF 3 by the catalytic reaction of HC (the hydrocarbons). In such a case, a corrected amount for the post injection is increased, as the deviation between the target temperature "THTRG" for the re-generation operation and the representative temperature "Tref" becomes larger, so that the representative temperature "Tref" becomes closer to the target temperature "THTRG" for the re-generation operation.

At a step S1000, the PM accumulated amount "MPM" is compared with a re-generation stopping value "MPML". In the case that the PM accumulated amount "MPM" becomes lower than the re-generation stopping value "MPML", the process goes to a step S1100, at which the flag "XRGN" is made OFF to end the process of the re-generation operation.

What is claimed is:

1. An exhaust gas purifying apparatus for an internal combustion engine comprising:
    a diesel particulate filter provided in an exhaust pipe of the engine for trapping diesel particulates contained in exhaust gas emitted from the engine; and
    an electronic control unit for controlling a re-generation operation of the diesel particulate filter, wherein the electronic control unit controls in such a manner that:
    the diesel particulate filter is hypothetically divided into multiple cells, which are sequentially arranged in a direction of exhaust gas flow, a temperature presuming point is hypothetically set in each of the cells, a temperature at the temperature presuming point is presumed by calculating a heat budget for the cell without directly detecting the temperature of the cell,
    a maximum temperature of the diesel particulate filter is presumed from the multiple presumed temperatures at the respective temperature presuming points, and
    the temperature of the diesel particulate filter is controlled in a way that the presumed maximum temperature may not become higher than a predetermined value, wherein
    the temperature at the respective temperature presuming points is presumed based on an outside information of the exhaust gas flowing into the diesel particulate filter and an inside information of the diesel particulate filter;
    the outside information comprises at least one of the followings;
    an amount of the exhaust gas flowing into the diesel particulate filter;
    a temperature of the exhaust gas flowing into the diesel particulate filter; and
    an amount of hydrocarbons flowing into the diesel particulate filter, and
    the inside information comprises at least one of the followings;
    an accumulated amount of the diesel particulates around the respective temperature presuming points; and
    an amount of hydrocarbons around the respective temperature presuming points.

2. An exhaust gas purifying apparatus according to claim 1,
    wherein the temperature at the respective temperature presuming points is presumed by calculating heat budget of the cells based on heat quantity with respect to at least one of the followings; the heat transfer between the cell and the exhaust gas flowing through the cell; the combustion of the diesel particulates in the cell; the combustion of the hydrocarbons in the cell; and the heat conduction between the cells.

3. An exhaust gas purifying apparatus according to claim 1, wherein
    the multiple temperature presuming points are arranged in a direction of the exhaust gas flowing through the diesel particulate filter.

4. An exhaust gas purifying apparatus according to claim 1, wherein
    a representative temperature of the diesel particulate filter is calculated from the presumed temperatures at the respective temperature presuming points, and
    the temperature of the diesel particulate filter is controlled so that the representative temperature is made close to a desired target temperature for the re-generation operation.

5. An exhaust gas purifying apparatus according to claim 1, wherein
    an accumulated amount of the diesel particulates in the diesel particulate filter is presumed from the followings;
    a temperature distribution information based on the presumed temperatures at the respective temperature presuming points,
    a differential pressure information of a pressure difference between the pressures at a front end and a rear end of the diesel particulate filter, and
    an amount of the exhaust gas flowing through the diesel particulate filter.

6. exhaust gas purifying apparatus for an internal combustion engine comprising:
    a diesel particulate filter provided in an exhaust pipe of the engine for trapping diesel particulates contained in exhaust gas emitted from the engine; and
    an electronic control unit for controlling a re-generation operation of the diesel particulate filter, wherein the electronic control unit controls in such a manner that:
    temperatures at temperature presuming points hypothetically set at inside portions of multiple cells, which are formed by hypothetically dividing the diesel particulate filter into multiple pieces, are presumed,
    a maximum temperature of the diesel particulate filter is presumed from the multiple presumed temperatures at the respective temperature presuming points, and
    the temperature of the diesel particulate filter is controlled in a way that the presumed maximum temperature may not become higher than a predetermined value,
    wherein
    the temperature at the respective temperature presuming points is presumed based on an outside information of the exhaust gas flowing into the diesel particulate filter and an inside information of the diesel particulate filter,
    the outside information comprises at least one of the following:
    an amount of the exhaust gas flowing into the diesel particulate filter;
    a temperature of the exhaust gas flowing into the diesel particulate filter; and
    an amount of hydrocarbons flowing into the diesel particulate filter, and
    the inside information comprises at least one of the followings;
    an accumulated amount of the diesel particulates around the respective temperature presuming points; and
    an amount of hydrocarbons around the respective temperature presuming points, and the temperature at the respective temperature presuming points is presumed based on the accumulated amount of the diesel particulates at the respective temperature presuming points.

7. An exhaust gas purifying apparatus for an internal combustion engine comprising:
a diesel particulate filter provided in an exhaust pipe of the engine for trapping diesel particulates contained in exhaust gas emitted from the engine; and
an electronic control unit for controlling a re-generation operation of the diesel particulate filter, wherein the electronic control unit controls in such a manner that:
temperatures at temperature presuming points hypothetically set at inside portions of multiple cells, which are formed by hypothetically dividing the diesel particulate filter into multiple pieces, are presumed,
a maximum temperature of the diesel particulate filter is presumed from the multiple presumed temperatures at the respective temperature presuming points, and
the temperature of the diesel particulate filter is controlled in a way that the presumed maximum temperature may not become higher than a predetermined value,
wherein
the temperature at the respective temperature presuming points is presumed by calculating heat budget of the cells based on heat quantity with respect to at least one of the followings:
the heat transfer between the cell and the exhaust gas flowing through the cell;
the combustion of the diesel particulates in the cell;
the combustion of the hydrocarbons in the cell; and
the heat conduction between the cells, and
the heat transfer between the cell and the exhaust gas flowing through the cell is calculated based on a heat transfer coefficient with which the temperature of the cell becomes equal to that of the exhaust gas flowing through the cell.

8. An exhaust gas purifying apparatus for an internal combustion engine comprising:
a diesel particulate filter provided in an exhaust pipe of the engine for trapping diesel particulates contained in exhaust gas emitted from the engine; and
an electronic control unit for controlling a re-generation operation of the diesel particulate filter, wherein the electronic control unit controls in such a manner that:
the diesel particulate filter is hypothetically divided into multiple cells, which are sequentially arranged in a direction of exhaust gas flow, a temperature presuming point is hypothetically set in each of the cells, a temperature at the temperature presuming point is presumed by calculating a heat budget for the cell without directly detecting the temperature of the cell,
a maximum temperature of the diesel particulate filter is presumed from the multiple presumed temperatures at the respective temperature presuming points, and
the temperature of the diesel particulate filter is controlled in a way that the presumed maximum temperature may not become higher than a predetermined value, wherein
the multiple temperature presuming points are arranged in a direction of the exhaust gas flowing through the diesel particulate filter, and
the number of the multiple temperature presuming points in a front half portion of the diesel particulate filter is larger than that of a rear half portion of the diesel particulate filter.

9. An exhaust gas purifying apparatus according to claim 1, wherein
the presumed temperatures at the respective temperature presuming points are corrected based on at least one of detected temperatures at a front end and a rear end of the diesel particulate filter.

10. An exhaust gas purifying apparatus for an internal combustion engine comprising:
a diesel particulate filter provided in an exhaust pipe of the engine for trapping diesel particulates contained in exhaust gas emitted from the engine; and
an electronic control unit for controlling a re-generation operation of the diesel particulate filter, wherein the electronic control unit controls in such a manner that:
temperatures at temperature presuming points hypothetically set at inside portions of multiple cells, which are formed by hypothetically dividing the diesel particulate filter into multiple pieces, are presumed,
a maximum temperature of the diesel particulate filter is presumed from the multiple presumed temperatures at the respective temperature presuming points, and
the temperature of the diesel particulate filter is controlled in a way that the presumed maximum temperature may not become higher than a predetermined value,
wherein
a representative temperature of the diesel particulate filter is calculated from the presumed temperatures at the respective temperature presuming points,
the temperature of the diesel particulate filter is controlled so that the representative temperature is made close to a desired target temperature for the re-generation operation, and
the representative temperature is calculated by a linear combination of the presumed temperatures at the respective temperature presuming points.

11. An exhaust gas purifying apparatus for an internal combustion engine comprising:
a diesel particulate filter provided in an exhaust pipe of the engine for trapping diesel particulates contained in exhaust gas emitted from the engine; and
an electronic control unit for controlling a re-generation operation of the diesel particulate filter, wherein the electronic control unit controls in such a manner that;
temperatures at temperature presuming points hypothetically set at inside portions of multiple cells, which are formed by hypothetically dividing the diesel particulate filter into multiple pieces, are presumed,
a maximum temperature of the diesel particulate filter is presumed from the multiple presumed temperatures at the respective temperature presuming points, and
the temperature of the diesel particulate filter is controlled in a way that the presumed maximum temperature may not become higher than a predetermined value,
wherein
a representative temperature of the diesel particulate filter is calculated from the presumed temperatures at the respective temperature presuming points,
the temperature of the diesel particulate filter is controlled so that the representative temperature is made close to a desired target temperature for the re-generation operation, and
the maximum temperature of the diesel particulate filter among the multiple presumed temperatures at the respective temperature presuming points is calculated as the representative temperature.

12. An exhaust gas purifying apparatus for an internal combustion engine comprising:
- a diesel particulate filter provided in an exhaust pipe of the engine for trapping diesel particulates contained in exhaust gas emitted from the engine; and
- an electronic control unit for controlling a re-generation operation of the diesel particulate filter, wherein the electronic control unit controls in such a manner that;
- temperatures at temperature presuming points hypothetically set at inside portions of multiple cells, which are formed by hypothetically dividing the diesel particulate filter into multiple pieces, are presumed,
- a maximum temperature of the diesel particulate filter is presumed from the multiple presumed temperatures at the respective temperature presuming points, and
- the temperature of the diesel particulate filter is controlled in a way that the presumed maximum temperature may not become higher than a predetermined value, wherein
- a representative temperature of the diesel particulate filter is calculated from the presumed temperatures at the respective temperature presuming points,
- the temperature of the diesel particulate filter is controlled so that the representative temperature is made close to a desired target temperature for the re-generation operation, and
- the target temperature for the re-generation operation is made lower, as the detected temperature at the rear half portion of the diesel particulate filter becomes higher.

* * * * *